US012126120B2

(12) United States Patent
Zeng

(10) Patent No.: US 12,126,120 B2
(45) Date of Patent: Oct. 22, 2024

(54) ELECTRICAL CONNECTOR AND ELECTRICAL CONNECTOR ASSEMBLY

(71) Applicant: Molex, LLC, Lisle, IL (US)

(72) Inventor: Ning Zeng, Jurong Town (SG)

(73) Assignee: Molex, LLC, Lisle, IL (US)

( * ) Notice: Subject to any disclaimer, the term of this patent is extended or adjusted under 35 U.S.C. 154(b) by 348 days.

(21) Appl. No.: 17/750,401

(22) Filed: May 23, 2022

(65) Prior Publication Data

US 2022/0384995 A1 Dec. 1, 2022

(30) Foreign Application Priority Data

May 27, 2021 (CN) ........................ 202110585034.1

(51) Int. Cl.

*H01R 13/6471* (2011.01)
*H01R 13/24* (2006.01)
*H01R 13/502* (2006.01)
*H01R 13/6477* (2011.01)

(52) U.S. Cl.

CPC ..... *H01R 13/6471* (2013.01); *H01R 13/2407* (2013.01); *H01R 13/502* (2013.01); *H01R 13/6477* (2013.01)

(58) Field of Classification Search

CPC ............ H01R 13/6471; H01R 13/2407; H01R 13/502; H01R 13/6477; H01R 13/6582; H01R 13/6587; H01R 12/73; H01R 13/652; H01R 13/02; H01R 13/6461; H01R 13/6473; H01R 13/6581; H01R 24/00

USPC .......................................................... 439/404

See application file for complete search history.

(56) References Cited

U.S. PATENT DOCUMENTS

| | | | | |
|---|---|---|---|---|
| 7,798,852 B2 * | 9/2010 | Laurx | H01R 13/6585 439/607.11 |
| 8,840,431 B2 * | 9/2014 | Nguyen | H01R 13/6585 439/607.34 |
| 9,356,401 B1 * | 5/2016 | Horning | H01R 13/6587 |
| 9,548,570 B2 * | 1/2017 | Laurx | H01R 12/737 |
| 9,812,817 B1 * | 11/2017 | Shirai | H01R 13/6587 |

(Continued)

FOREIGN PATENT DOCUMENTS

| | | |
|---|---|---|
| CN | 104092059 A | 10/2014 |
| CN | 209016306 U | 6/2019 |

(Continued)

*Primary Examiner* — Alexander Gilman

(57) ABSTRACT

An electrical connector includes a plurality of signal terminal groups. Each signal terminal group includes a plurality of signal terminals having a first contact portion and a second contact portion, wherein the first contact portion has relatively more elasticity and the second contact portion has relatively less elasticity comparatively. The first contact portion and the second contact portion of each signal terminal are staggered with respect to each other. The connector includes a plurality of grounding members corresponding to the terminal groups, each having two side walls and a rear wall integrally constructed to surround a corresponding signal terminal group from at least three sides, two ground terminals integrally constructed positioned at a left side and a right side, third contact portions having relatively more elasticity, and fourth contact portions having relatively less elasticity, the third contact portion and the fourth contact portion are staggered with respect to each other.

20 Claims, 19 Drawing Sheets

(56) References Cited

U.S. PATENT DOCUMENTS

| | | | | |
|---|---|---|---|---|
| 9,917,406 | B1 * | 3/2018 | Iwasaki | H01R 13/6588 |
| 10,522,948 | B2 * | 12/2019 | Cho | H01R 13/6471 |
| 10,644,453 | B2 * | 5/2020 | Laurx | H01R 13/6587 |
| 10,644,457 | B2 * | 5/2020 | Chen | H01R 24/60 |
| 2014/0057493 | A1 * | 2/2014 | De Geest | H01R 12/737 439/607.35 |
| 2016/0072231 | A1 * | 3/2016 | Sypolt | H01R 13/6585 439/607.08 |
| 2016/0285204 | A1 * | 9/2016 | Morgan | H01R 13/6471 |
| 2017/0069986 | A1 * | 3/2017 | Horning | H01R 13/6588 |
| 2019/0252828 | A1 * | 8/2019 | Miyamoto | H01R 13/50 |
| 2020/0343666 | A1 * | 10/2020 | Nakamura | H01R 12/57 |
| 2022/0384995 | A1 * | 12/2022 | Zeng | H01R 13/6471 |

FOREIGN PATENT DOCUMENTS

| | | | |
|---|---|---|---|
| JP | H057829 | B2 | 1/1993 |
| TW | M357733 | U | 5/2009 |
| TW | I720299 | B | 3/2021 |

* cited by examiner

ELECTRICAL CONNECTOR AND ELECTRICAL CONNECTOR ASSEMBLY

RELATED APPLICATIONS

This application claims priority to Chinese Patent Application No. 202110585034.1 filed on May 27, 2021, which is incorporated herein by reference in its entirety.

TECHNICAL FIELD

The present disclosure relates to an electrical connector, and particularly relates to an electrical connector and an electrical connector assembly.

BACKGROUND ART

Japanese patent application issuance publication No. JPH057829B2 discloses a mating terminal structure, in which, a contact portion of one of two terminals, which mate with each other respectively, contacts a fixing portion of the other of the two terminals, so that total two contact points are formed between the two terminals to increase contact stability of the two terminals.

U.S. Pat. No. 7,798,852B2 discloses a mezzanine-type electrical connector, the mezzanine-type electrical connector includes a plurality of terminal columns, ground terminals and differential signal terminal pairs of each terminal column are alternately arranged, the ground terminal of one of two adjacent terminal columns corresponds to the differential signal terminal pair of the other of the two adjacent terminal columns in position, and a body portion of the ground terminal is wider so that a width of the body portion of the ground terminal is larger than a side-by-side width of body portions of the differential signal terminal pair, each differential signal terminal pair is independently ground shielded. However, such a shielding arrangement is only constructed between the body portions of the corresponding terminals.

However, in order to further promote transmission speed of a signal, it needs to further reduce crosstalk of transmission of the signal, reduce impedance of the terminal and strengthen shielding between signal terminals. However, existing electrical connectors as disclosed in the above prior art are deficient to do so.

SUMMARY

Therefore, one of objects of the present disclosure is to provide an electrical connector and an electrical connector assembly which can improve at least one deficiency in prior art.

Accordingly, in some embodiments, an electrical connector of the present disclosure comprises a plurality of signal terminal groups and a plurality of grounding members. Each signal terminal group comprises a plurality of signal terminals, each signal terminal has a first contact portion and a second contact portion, the first contact portion has elasticity, the second contact portion relatively does not have elasticity when compared to the first contact portion, the first contact portion and the second contact portion of each signal terminal are staggered with respect to each other. The plurality of grounding members respectively correspond to the plurality of signal terminal groups, each grounding member has two side walls and a rear wall which are integrally constructed and surrounding the corresponding signal terminal group from at least three sides, two ground terminals which are integrally constructed and are respectively positioned at a left side and a right side of a corresponding signal terminal group, third contact portions which are respectively constructed to the two ground terminals and have elasticity, and fourth contact portions which are respectively positioned at the left side and the right side of the corresponding signal terminal group and relatively do not have elasticity when compared to the third contact portion, the respective third contact portion and the respective fourth contact portion at the same side of the corresponding signal terminal group are staggered with respect to each other.

In some embodiments, each side wall has a corresponding one of the two ground terminals and a side plate portion, a plate face of the side plate portion is constructed with the respective fourth contact portion, the respective third contact portion of the corresponding one of the two grounds terminal is disposed toward the inside of the corresponding one of the two ground terminals, while the fourth contact portion of the side plate portion is disposed toward the outside of the corresponding one of the two ground terminals, and the third contact portion and the fourth contact portion of each side wall are staggered in a front-rear direction and in an up-down direction.

In some embodiments, each grounding member further has two front plate portions which are respectively integrally constructed with the two side walls, the two front plate portions are respectively positioned at the left side and the right side of the corresponding signal terminal group, and outer side edges, which face each other, of the two front plate portions each are connected to the corresponding side wall, each front plate portion is constructed with the ground terminal, each ground terminal has an elastic arm which extends upwardly from the front plate portion, the third contact portion is positioned to an upper end of the elastic arm, the fourth contact portion is positioned to a lower end of the elastic arm, the third contact portion and the fourth contact portion of each ground terminal face the front of the ground terminal and are staggered in an up-down direction.

In some embodiments, each grounding member further has two front plate portions which respectively are integrally constructed with the two side walls, the two front plate portions are respectively positioned at the left side and the right side of the corresponding signal terminal group, and inner side edges, which face each other, of each front plate portion each are connected to the corresponding side wall, each front plate portion is constructed with the ground terminal, each ground terminal has an elastic arm which extends upwardly from the front plate portion, the third contact portion is positioned to an upper end of the elastic arm, the fourth contact portion positioned to a lower end of the elastic arm, the third contact portion and the fourth contact portion of each ground terminal face the front of the ground terminal and are staggered in an up-down direction.

In some embodiments, a height of the rear wall and heights of the two side walls in each grounding member each is higher than an upper end of each corresponding signal terminal.

In some embodiments, each signal terminal has a fixing portion, a tail portion which extends downwardly from the fixing portion, and an elastic arm which extends upwardly from the fixing portion, the first contact portion is positioned to an upper end of the elastic arm, the second contact portion is positioned to a lower end of the elastic arm, the first contact portion and the second contact portion of each signal terminal face the front of the ground terminal and are staggered in an up-down direction.

In some embodiments, each signal terminal group has two signal terminals which constitute a differential pair and an insulative block, the two signal terminals are provided to the insulative block, a front surface of the fixing portion of each signal terminal is exposed to the insulative block and three other surfaces of the fixing portion of each signal terminal are embedded in the insulative block, the second contact portion is constructed to the front surface of the fixing portion.

In some embodiments, the electrical connector further comprises a base, the base has a plurality of assembling holes, each assembling hole is used to assemble one of the plurality of signal terminal groups and one of the plurality of the grounding members.

In some embodiments, the signal terminal group and the one of the plurality of grounding members which correspond to each other are firstly assembled with each other by an assembling construction and then are assembled to the base.

In some embodiments, the assembling construction comprises a protruding block and an insertion hole which are assembled to each other, the protruding block is constructed to a rear side surface of the insulative block, the insertion hole is constructed to the rear wall of the one of the plurality of grounding members.

Accordingly, in some embodiments, an electrical connector assembly of the present disclosure comprises two electrical connectors having a similar construction to each other and to mate with each other. Each electrical connector comprises a plurality of signal terminal groups and a plurality of grounding members. Each signal terminal group comprises a plurality of signal terminals, each signal terminal has a first contact portion and a second contact portion, the first contact portion has elasticity, the second contact portion relatively does not have elasticity compared to the first contact portion, the first contact portion and the second contact portion of each signal terminal are staggered with respect to each other. The plurality of grounding members respectively correspond to the plurality of signal terminal groups, each grounding member has two side walls and a rear wall which are integrally constructed and surround the corresponding signal terminal group from at least three sides, two ground terminals which are integrally constructed and are respectively positioned at a left side and a right side of the corresponding signal terminal group, third contact portions which are respectively constructed to the two ground terminals and have relative elasticity, and fourth contact portions which are respectively positioned at the left side and the right side of the corresponding signal terminal group and relatively do not have elasticity when compared to the third contact portion, the third contact portion and the fourth contact portion at the same side of the corresponding signal terminal group are staggered with respect to each other. Wherein, when the two electrical connectors mate with each other, the two grounding members, which mate with each other, of the two electrical connectors together surround the two signal terminal groups, which mate with each other, from four sides; the third contact portions of the two grounding members which mate with each other respectively contact the fourth contact portions of the two grounding members which mate with each other to constitute total four ground contact points, two ground contact points of the four ground contact points are positioned to the left side and the other two ground contact points of the four ground contact points are positioned to the right side; the first contact portions of the two signal terminals which mate with each other contact the second contact portions of the two signal terminals which mate with each other to constitute two signal contact points, the two signal contact points are staggered in an up-down direction.

In some embodiments, each side wall has a corresponding one of the two ground terminals and a side plate portion, a plate face of the side plate portion is constructed with the respective fourth contact portion, the respective third contact portion of the corresponding one of the two ground terminals is toward the inside of the corresponding one of the two ground terminals, but the fourth contact portion of the side plate portion is toward the outside of the corresponding one of the two ground terminals, and the third contact portion and the fourth contact portion of each side wall are staggered in a front-rear direction and in the up-down direction.

In some embodiments, two ground contact points, which are positioned to the same side, of the four ground contact points are staggered in the front-rear direction and in the up-down direction, and the four ground contact points each form contact in a left-right direction.

In some embodiments, each grounding member further has two front plate portions which are respectively integrally constructed with the two side walls, the two front plate portions are respectively positioned at the left side and the right side of the corresponding signal terminal group, and outer side edges, which face each other, of the two front plate portions each are connected to the corresponding side wall, each front plate portion is constructed with the ground terminal, each ground terminal has an elastic arm which extends upwardly from the front plate portion, the third contact portion is positioned to an upper end of the elastic arm, the fourth contact portion is positioned to a lower end of the elastic arm, the third contact portion and the fourth contact portion of each ground terminal face the front and are staggered in the up-down direction.

In some embodiments, each grounding member further has two front plate portions which respectively are integrally constructed with the two side walls, the two front plate portions are respectively positioned at the left side and the right side of the corresponding signal terminal group, and inner side edges, which face each other, of each front plate portion each are connected to the corresponding side wall, each front plate portion is constructed with the ground terminal, each ground terminal has an elastic arm which extends upwardly from the front plate portion, the third contact portion is positioned to an upper end of the elastic arm, the fourth contact portion positioned to a lower end of the elastic arm, the third contact portion and the fourth contact portion of each ground terminal face the front and are staggered in the up-down direction.

In some embodiments, two ground contact points, which are positioned to the same side, of the four ground contact points are staggered in the up-down direction, and the four ground contact points each from contact in a front-rear direction.

In some embodiments, a height of the rear wall and heights of the two side walls in each grounding member each is higher than an upper end of each corresponding signal terminal.

In some embodiments, each signal terminal has a fixing portion, a tail portion which extends downwardly from the fixing portion, and an elastic arm which extends upwardly from the fixing portion, the first contact portion is positioned to an upper end of the elastic arm, the second contact portion is positioned to a lower end of the elastic arm, the first contact portion and the second contact portion of each signal terminal face the front and are staggered in an up-down direction, the two signal contact points each form contact in a front-rear direction.

In some embodiments, each signal terminal group has two signal terminals which constitute a differential pair and an insulative block, the two signal terminals are provided to the insulative block, a front surface of the fixing portion of each signal terminal is exposed to the insulative block and three other surfaces of the fixing portion of each signal terminal are embedded in the insulative block, the second contact portion is constructed to the front surface of the fixing portion.

In the present disclosure, by the design and arrangement manner that the two grounding members surround the signal terminals from four sides, more complete and full shielding function can be formed with respect to the signal terminals, to reduce crosstalk, reduce impedance of the signal terminal, strengthen coupling between the signal terminal groups, promote integrity of the signal, increase transmission speed of the signal.

BRIEF DESCRIPTION OF THE DRAWINGS

Other features and technical effects of the present disclosure will be apparent in embodiments referring to the accompanying figures, in which.

DETAILED DESCRIPTION OF THE PREFERRED EMBODIMENT

Figure 1:
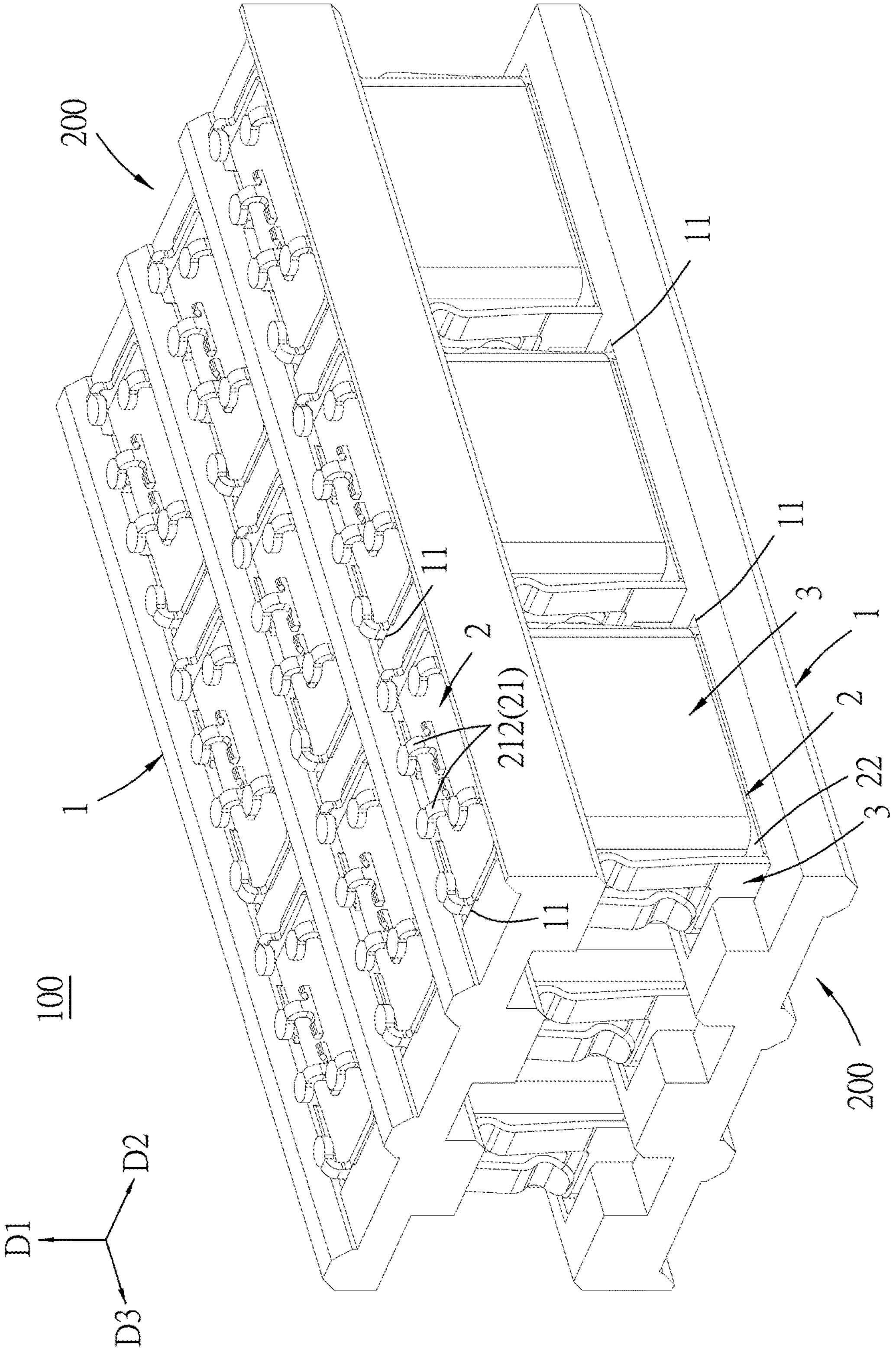
FIG. 1 is a perspective view of a first embodiment of an electrical connector assembly of the present disclosure in which two electrical connectors of the first embodiment mate with each other.
Figure 2:
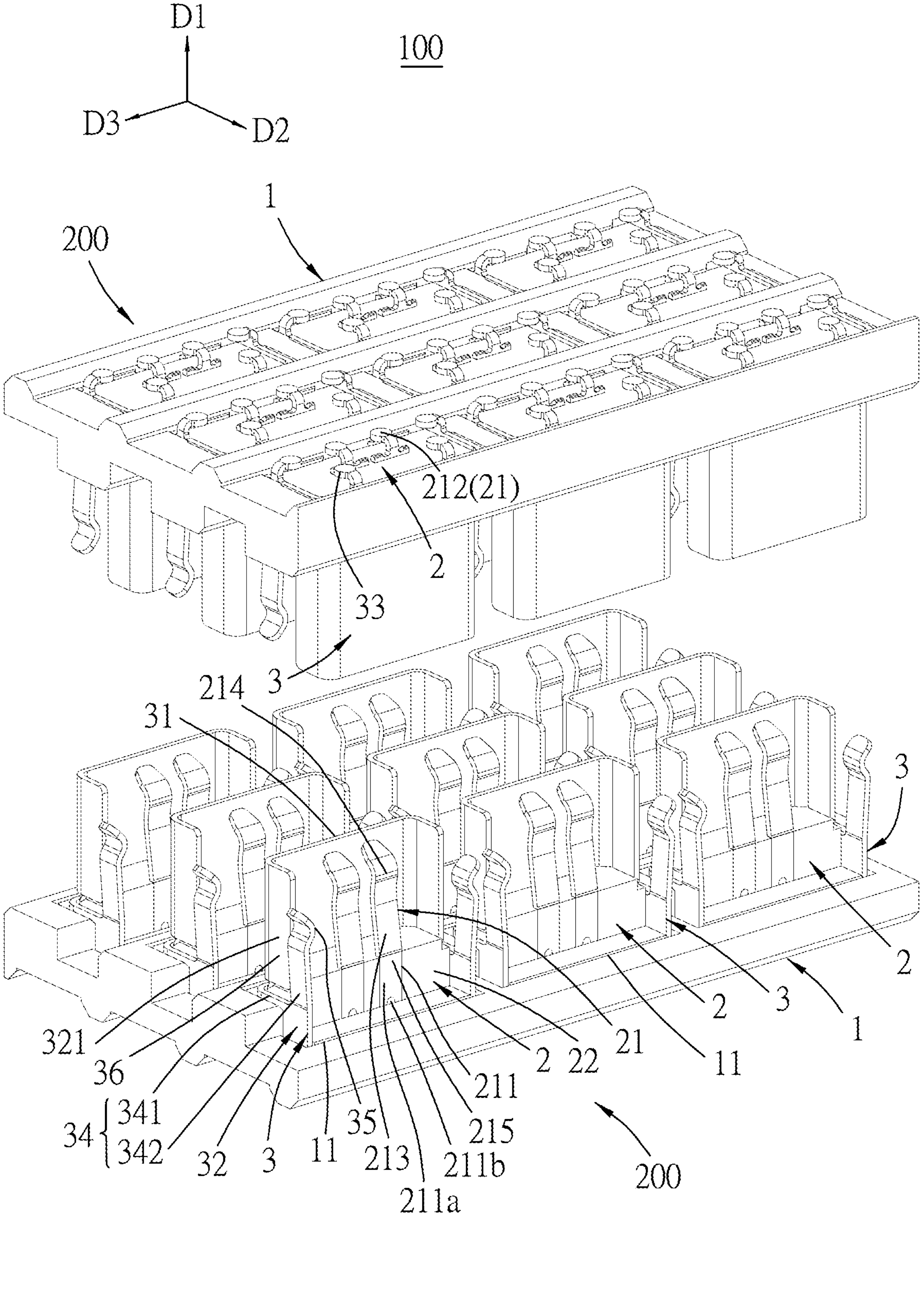
FIG. 2 is a perspective exploded view of FIG. 1.
Figure 3:
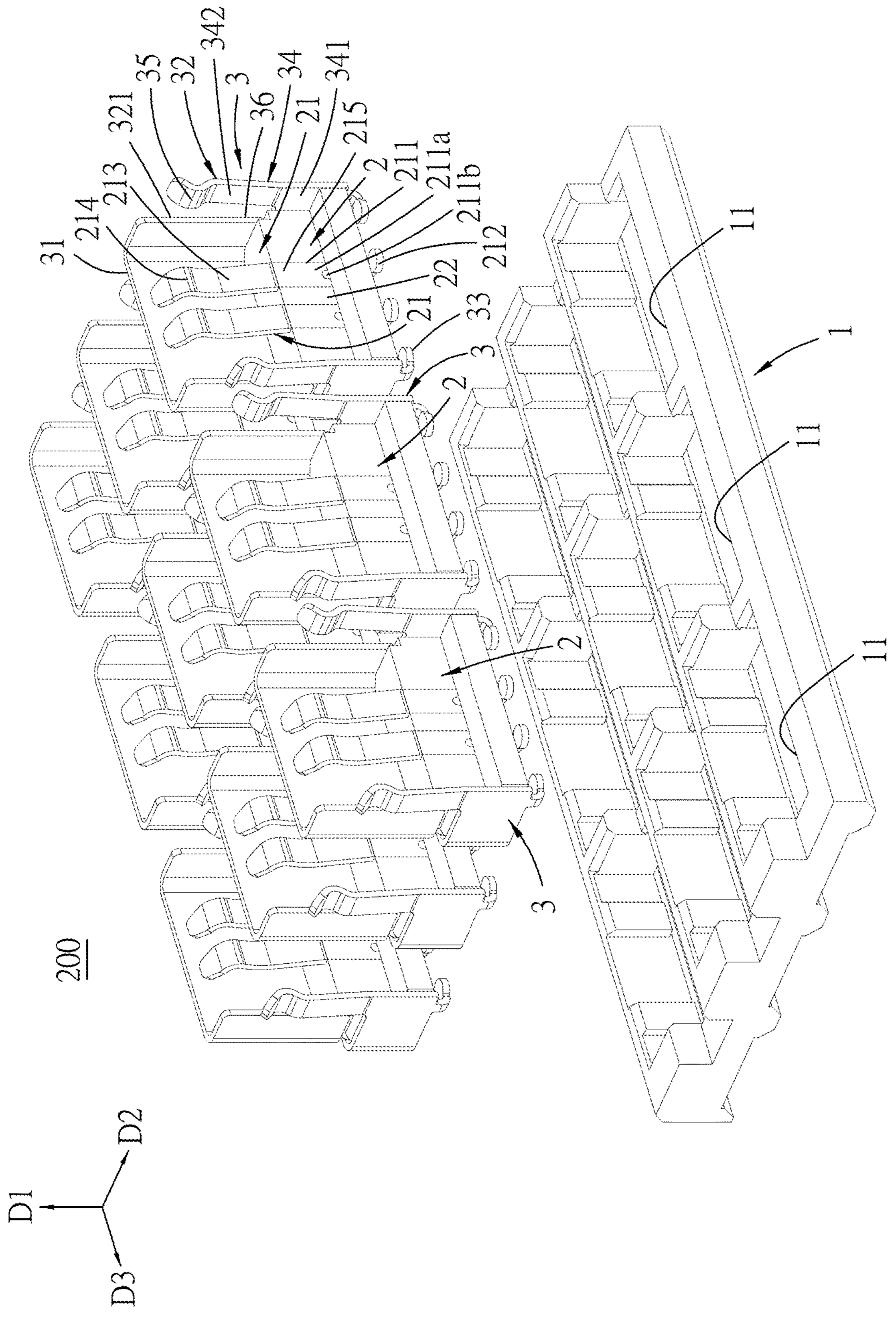
FIG. 3 is a perspective exploded view further on a basis of FIG. 2.

Before the present disclosure is described in detail, it should be noted that like elements are denoted by the same reference numerals in the following description.

Referring to FIG. 1 to FIG. 4, a first embodiment of an electrical connector assembly 100 of the present disclosure includes two electrical connectors 200 having a similar construction and are used to mate with each other along an up-down direction D1 (a direction to which an arrow points is up, and an opposite direction is down). Each electrical connector 200 includes a base 1, a plurality of signal terminal groups 2 and a plurality of grounding members 3.

The base 1 extends along a front-rear direction D2 (a direction to which an arrow points is front, and an opposite direction is rear) and a left-right direction D3 (a direction to which an arrow points is left, and an opposite direction is right) and has a plurality of assembling holes 11 which are formed within the base 1 penetratingly in the up-down direction D1. Each assembling hole 11 is used to assemble one of the plurality of signal terminal groups 2 and one of the plurality of the grounding members 3.

Figure 8:
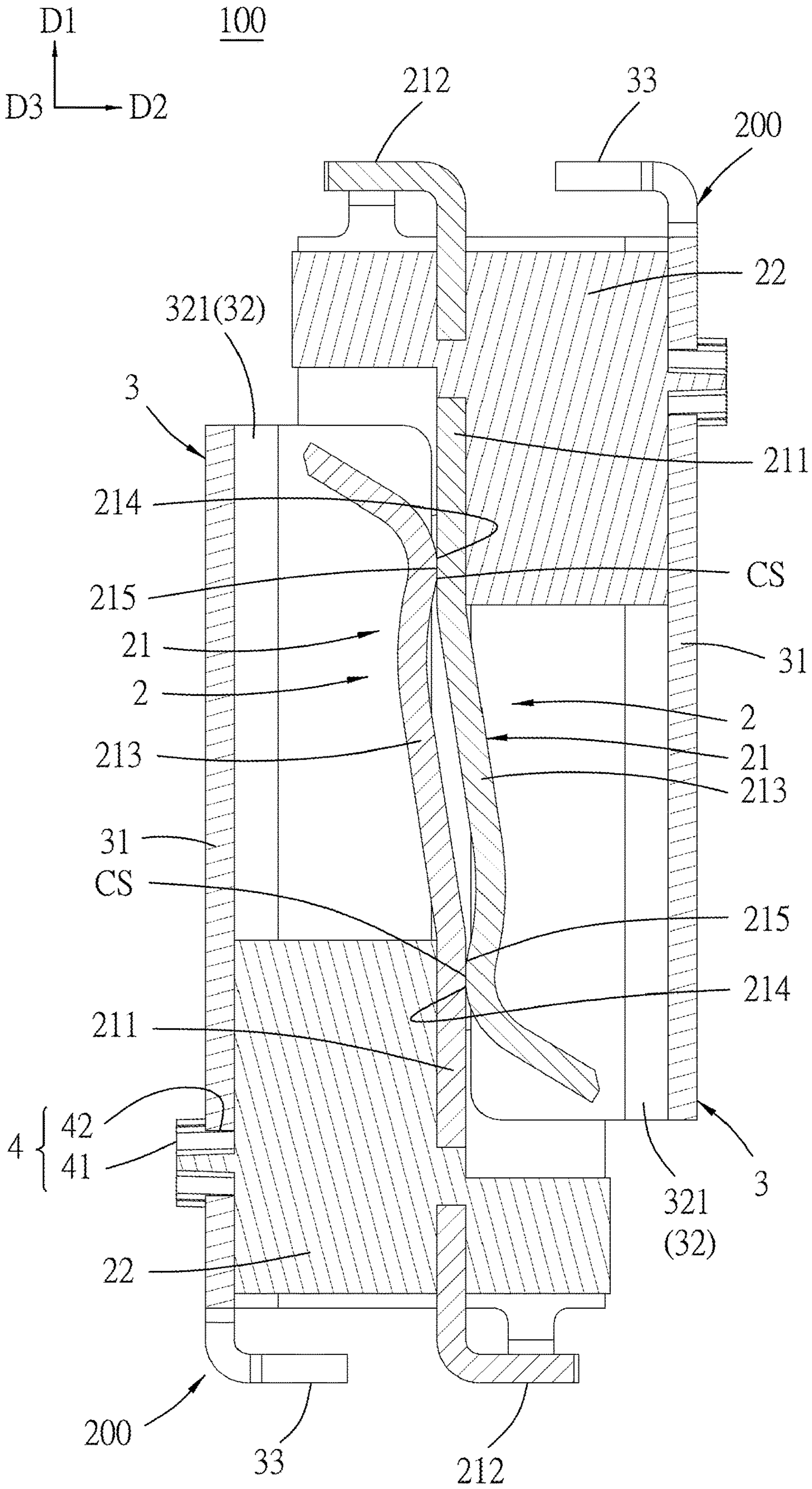
FIG. 8 is a cross sectional view of FIG. 7 illustrating a contact relationship between the signal terminal groups of the two electrical connectors.
Figure 9:
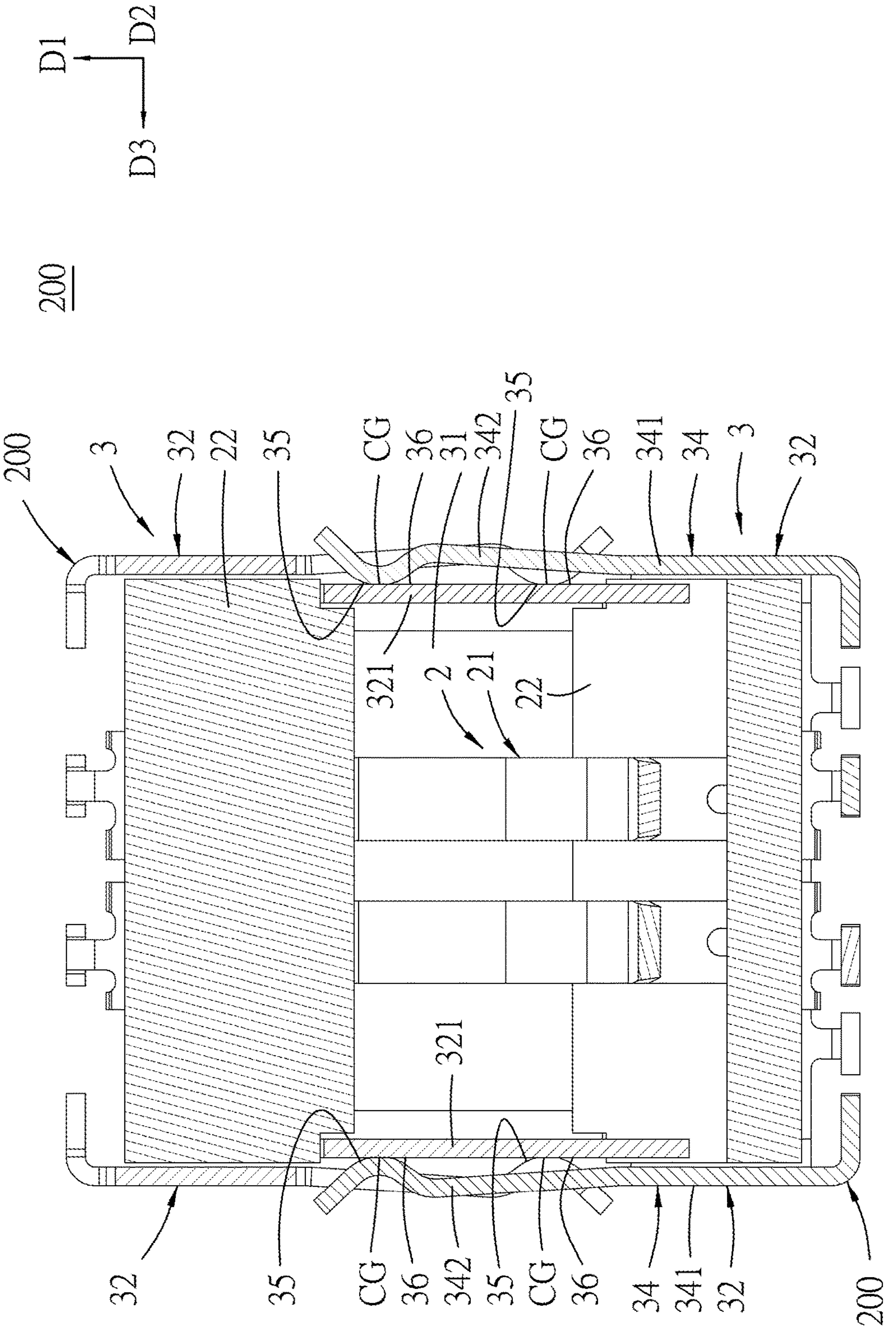
FIG. 9 is another cross-sectional view of FIG. 7 illustrating a contact relationship between the grounding members of the two electrical connectors.

Each signal terminal group 2 includes two signal terminals 21 which constitute a differential pair, extend substantially along the up-down direction D1, and are arranged side by side along the left-right direction D3, and an insulative block 22. Each signal terminal 21 has a fixing portion 211 which is provided to the insulative block 22, a tail portion 212 which extends downwardly from the fixing portion 211, a substantially elastic (herein referred to as "elastic) arm 213 which extends upwardly from the fixing portion 211, a first contact portion 214 which is positioned to an upper end of the elastic arm 213, and a second contact portion 215 which is positioned to a lower end of the elastic arm 213 in comparison to the position of the first contact portion 214 of the elastic arm 213. The first contact portion 214 has relatively more elasticity and the second contact portion 215 has relatively less elasticity compared to the first contact portion 214, and, the first contact portion 214 and the second contact portion 215 face the front and are staggered with respect to each other in the up-down direction D1. For example, the two signal terminals 21 are provided to the insulative block 22 by insert molding (or over-molding), a front surface 211*a* of the fixing portion 211 of each signal terminal 21 is exposed to the insulative block 22 and the other three surfaces of the fixing portion 211 of each signal terminal 21 are embedded in the insulative block 22, specifically, the second contact portion 215 is constructed to the front surface 211*a* of the fixing portion 211, in addition, for example, the fixing portion 211 is further formed with an aperture 211*b* which cooperates with a protrusion of the insulative block 22 to increase embedding engagement force of the fixing portion 211 to the insulative block 22. As shown in FIG. 8, when two electrical connectors 200 mate with each other, one electrical connector 200 positioned to the upward direction D1 is disposed to correspondingly meet another flipped electrical connector 200, the first contact portions 214 of the two signal terminals 21 which mate with each other respectively contact the second contact portions 215 of the two signal terminals 21 which mate with each other, to constitute two signal contact points CS, the two signal contact points CS are staggered in the up-down direction D1, and the two signal contact points CS each form contact in the front-rear direction D2.

Referring to FIG. 3 to FIG. 6, the plurality of grounding members 3 respectively correspond to the plurality of signal terminal groups 2. Each grounding member 3 has a rear wall 31 and two side walls 32 which are integrally constructed and surround the corresponding signal terminal group 2 from at least three sides, four tail portions 33 which extend downwardly from a bottom edge of the rear wall 31 and bottom edges of the two side walls 32, two ground terminals 34 which are integral constructed and are respectively positioned at a left side and a right side (outer sides) of the signal terminal group 2, two third contact portions 35 which are respectively constructed to the two ground terminals 34 and have relative elasticity when compared to the fourth contact portions, and two fourth contact portions 36 which are respectively positioned at the left side and the right side (the outer sides) of the signal terminal group 2 of and have relatively less elasticity, the third contact portion 35 and the fourth contact portion 36 are staggered with respect to each other. In the first embodiment, each side wall 32 has one ground terminal 34 which extends forwardly from a side edge of the rear wall 31 and a side plate portion 321. The ground terminal 34 has an extension portion 341 which extends forwardly from a lower segment of a side edge of the rear wall 31 and an elastic arm 342 which extends upwardly from the extension portion 341, the third contact portion 35 is positioned to an upper end of the elastic arm 342. The side plate portion 321 extends forwardly from an upper segment of the side edge of the rear wall 31 and is positioned behind the elastic arm 342 of the ground terminal 34, a plate face of the side plate portion 321 is constructed with the fourth contact portion 36. Here, the ground terminal 34 is positioned to an outer side relative to the side plate portion 321 and the third contact portion 35 of the ground terminal 34 is disposed toward the inside, the side plate portion 321 is positioned to an inner side relative to the ground terminal 34 and the fourth contact portion 36 of the side plate portion 321 is disposed toward the outside, the third contact portion 35 and the fourth contact portion 36 of each side wall 32 are staggered with respect to each other both in the front-rear direction D2 and in the up-down direction D1, specifically, the third contact portion 35 is positioned above and in front of the fourth contact portion 36. In addition, a height of the rear wall 31 and heights of the two side walls 32 in each grounding member 3 each are higher than an upper end of each corresponding signal terminal 21, to strengthen shielding effect. Furthermore, specifically, the two tail portions 33 of the four tail portions 33 are constructed to the bottom edge of the rear wall 31, the other two tail portions 33 of the four tail portions 33 are respectively constructed to the bottom edges of the two side walls 32, so that the four tail portions 33 of the grounding member 3 also surround the two tail portions 212 of the two signal terminals 21 from three sides. The tail portion 33 of the grounding member 3 and the tail portion 212 of the signal terminal 21 each are racket-shaped and each are used to be connected to a circuit board (not shown) by for example a solder ball.

Referring to FIG. 2 and FIG. 7 to FIG. 9, when two electrical connectors 200 mate with each other, the two grounding members 3, which mate with each other, of the two electrical connectors 200 together surround the two signal terminal groups 2, which mate with each other, from four sides. The third contact portions 35 of the two grounding members 3 which mate with each other respectively contact the fourth contact portions 36 of the two grounding members 3 which mate with each other, to constitute total four ground contact points CG, two of the four ground contact points CG are positioned to the left side and the other two of the four ground contact points CG are positioned to the right side, and, the two ground contact points CG, which are positioned to the same side, of the four ground contact points CG are staggered in the front-rear direction D2 and in the up-down direction D1, and, the four ground contact points CG each form contact in the left-right direction D3. By the design and arrangement manner that the two grounding members 3 surround the signal terminals 21 from four sides, more complete and full shielding function can be formed with respect to the signal terminals 21, to reduce crosstalk, reduce impedance of the signal terminal 21, strengthen coupling between the signal terminal groups 2, promote integrity of the signal, increase transmission speed of the signal.

Figure 4:
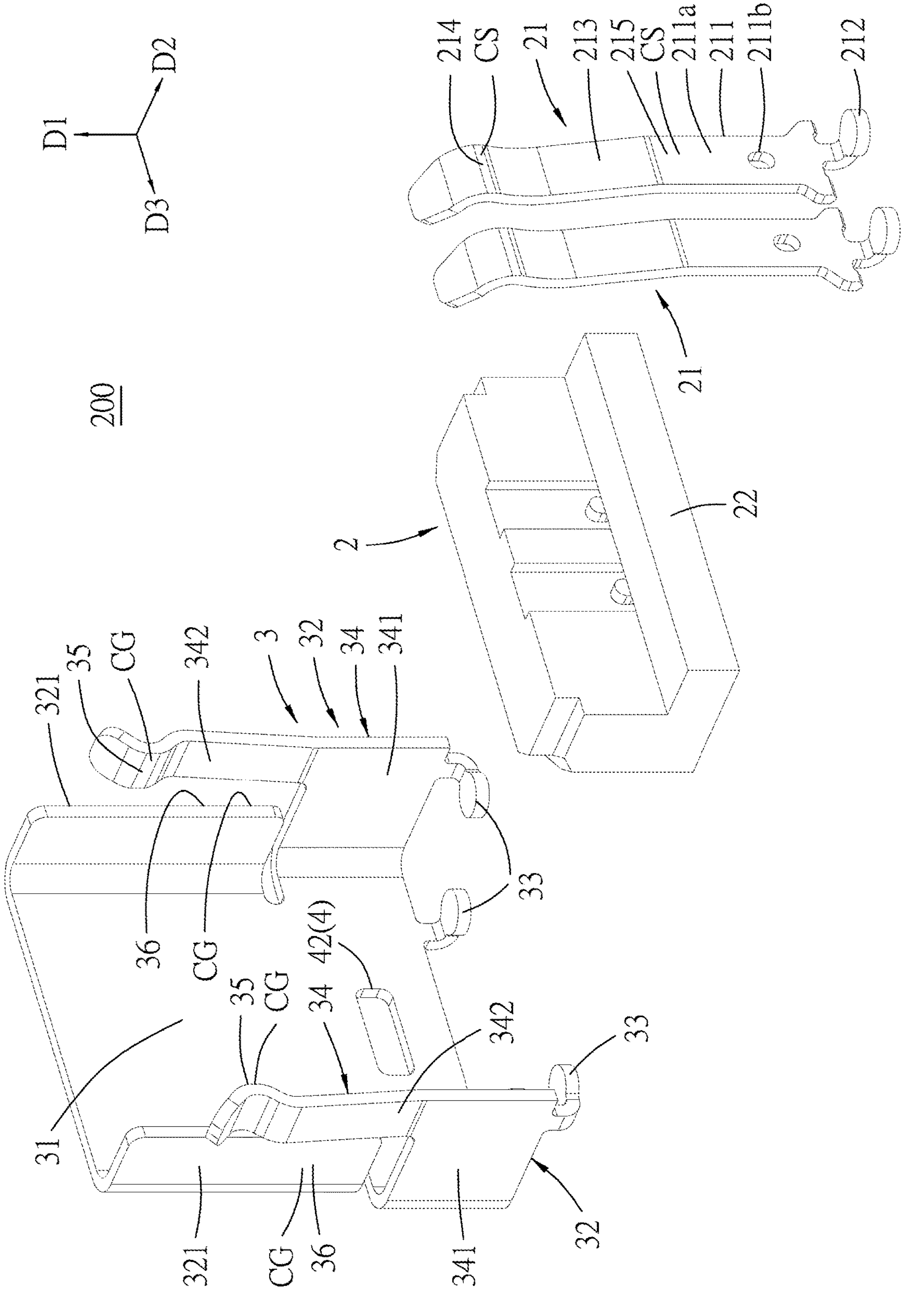
FIG. 4 is a perspective exploded view of a signal terminal group and a grounding member of the first embodiment.
Figure 5:
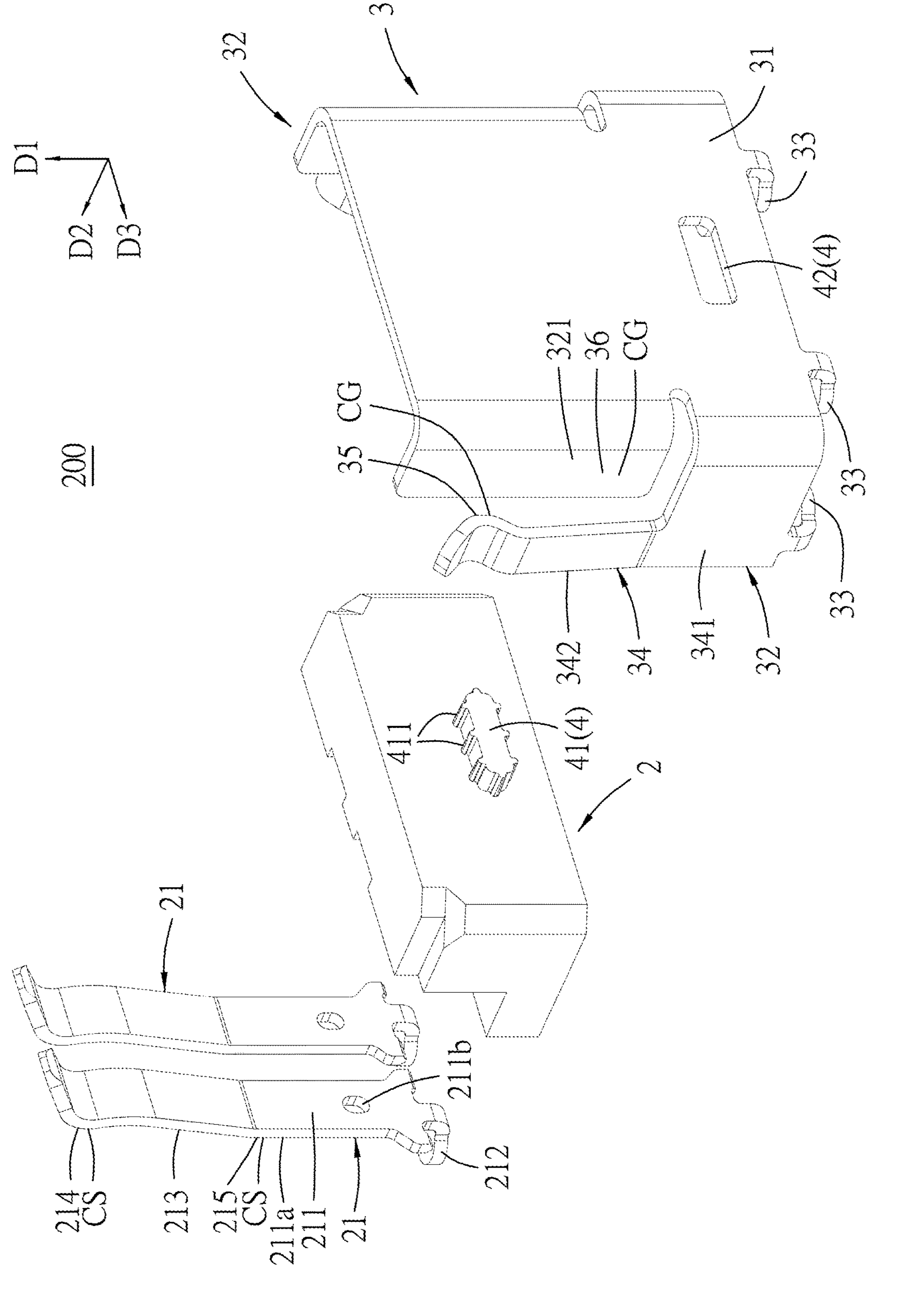
FIG. 5 is a perspective exploded view of the first embodiment of FIG. 4 from a different angle.
Figure 6:
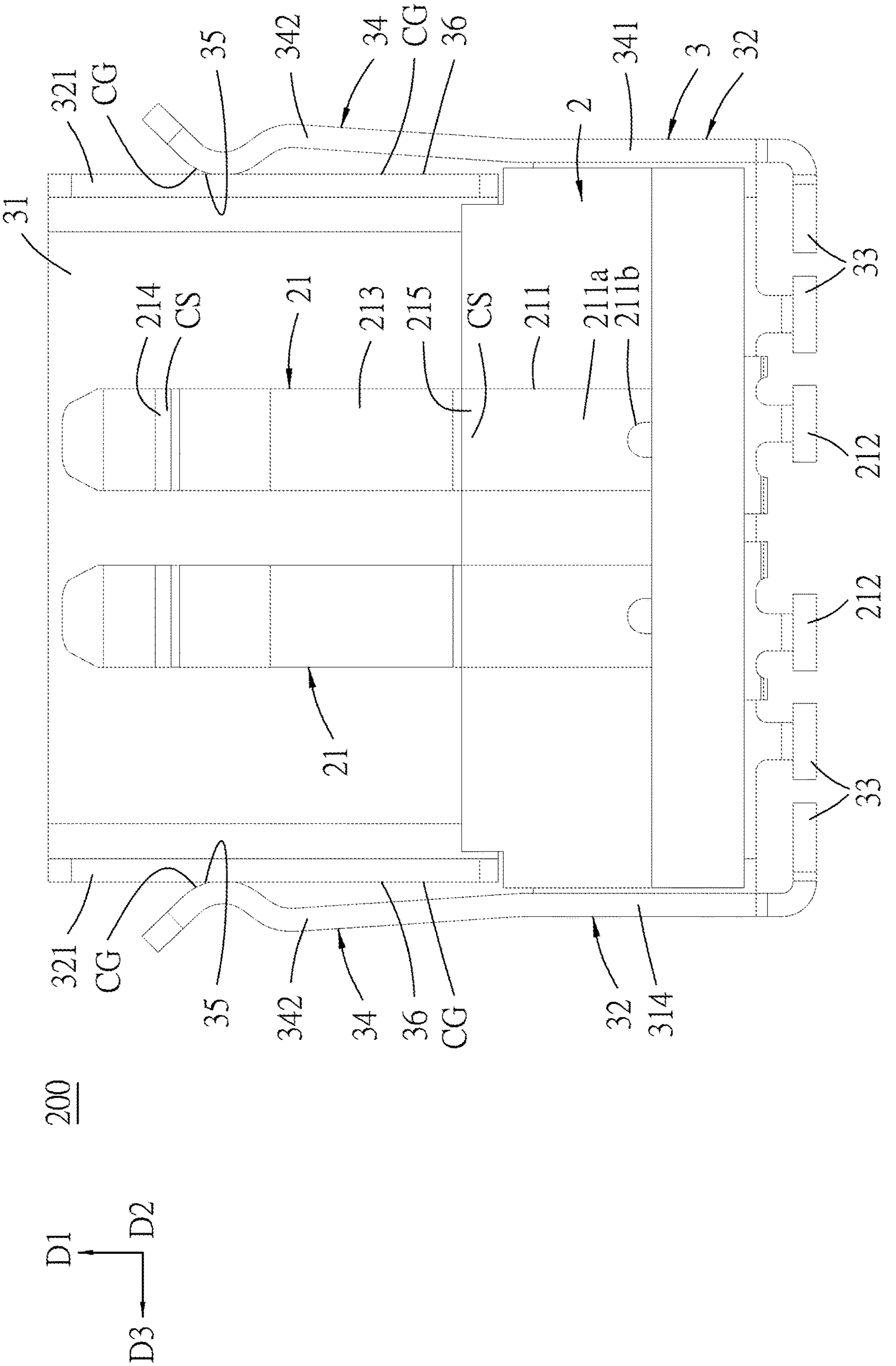
FIG. 6 is a front view of the signal terminal group and the grounding member of the first embodiment.
Figure 7:
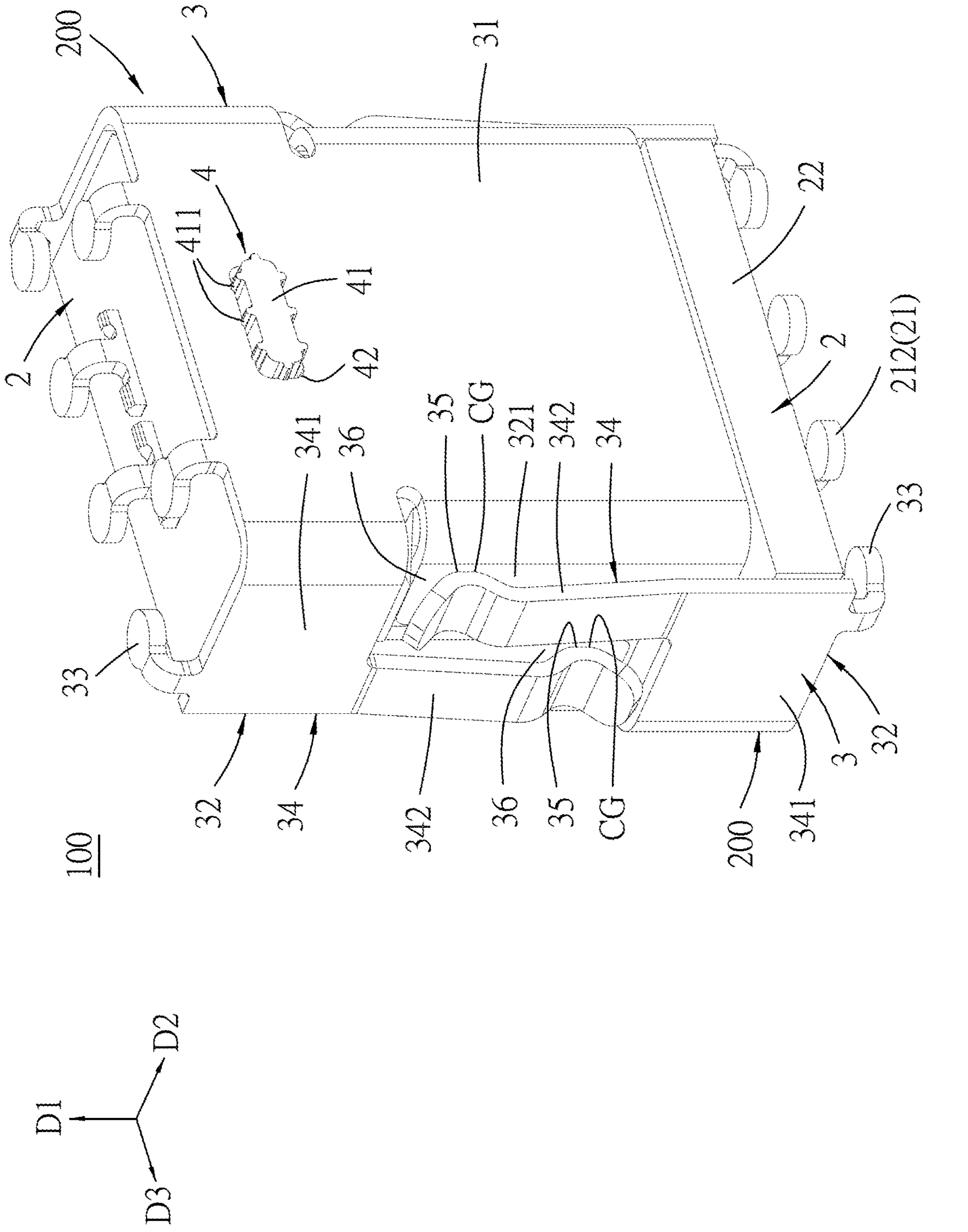
FIG. 7 is a perspective view when the signal terminal groups and the grounding members of the two electrical connectors of the first embodiment mate with each other.

Referring to FIG. 4, FIG. 5 and FIG. 7, in addition, in the first embodiment, the signal terminal group 2 and the grounding member 3 which correspond to each other are firstly assembled by an assembling construction 4 and then are assembled to the base 1. Specifically, the assembling construction 4 include a protruding block 41 to be received in an insertion hole 42 which are assembled to each other, the protruding block 41 is constructed to a rear side surface of the insulative block 22, the insertion hole 42 is constructed to the rear wall 31 of the grounding member 3, for example, the protruding block 41 may have a plurality of ribs 411 which interfere with an inner wall surface of the insertion hole 42 to restrict movement of the protruding block 41 when received into the insertion hole 42. In other implementing manners, the protruding block 41 also may be formed to the grounding member 3, wherein the insertion hole 42 is formed to the insulative block 22.

Figure 10:
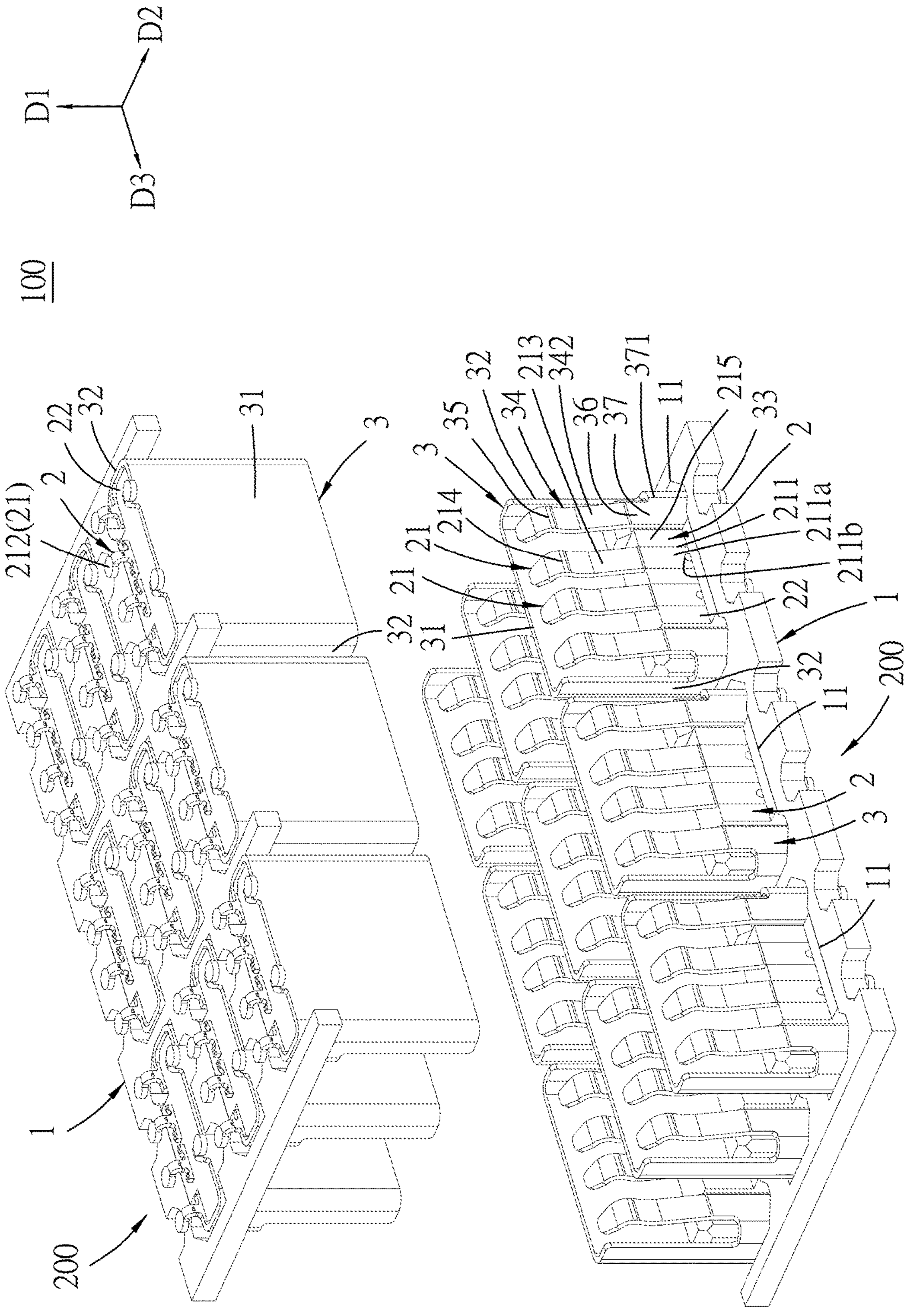
FIG. 10 is a perspective view of a second embodiment of the electrical connector assembly of the present disclosure in which two electrical connectors of the second embodiment do not mate with each other.
Figure 11:
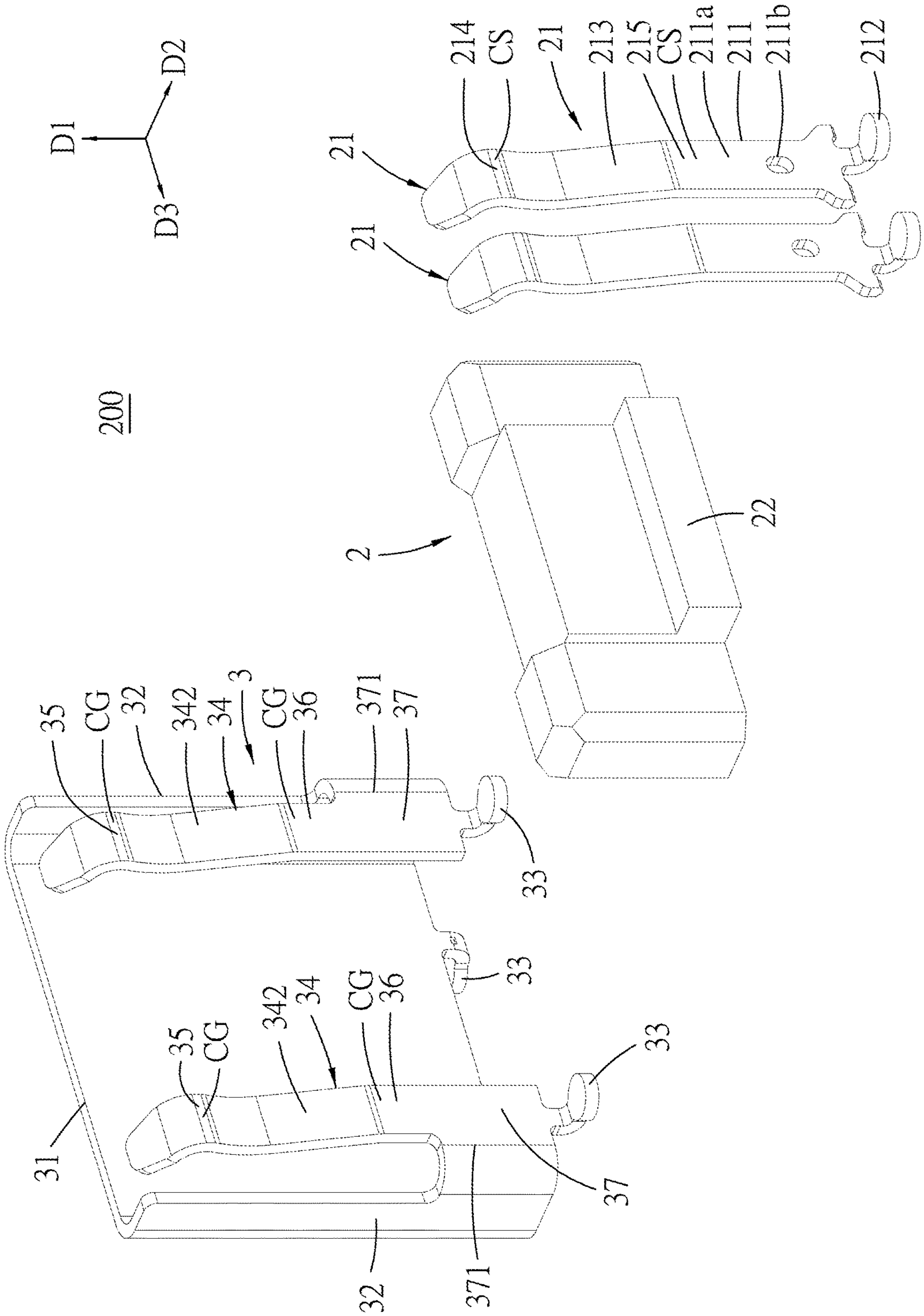
FIG. 11 is a perspective exploded view of a signal terminal group and a grounding member of the second embodiment.
Figure 12:
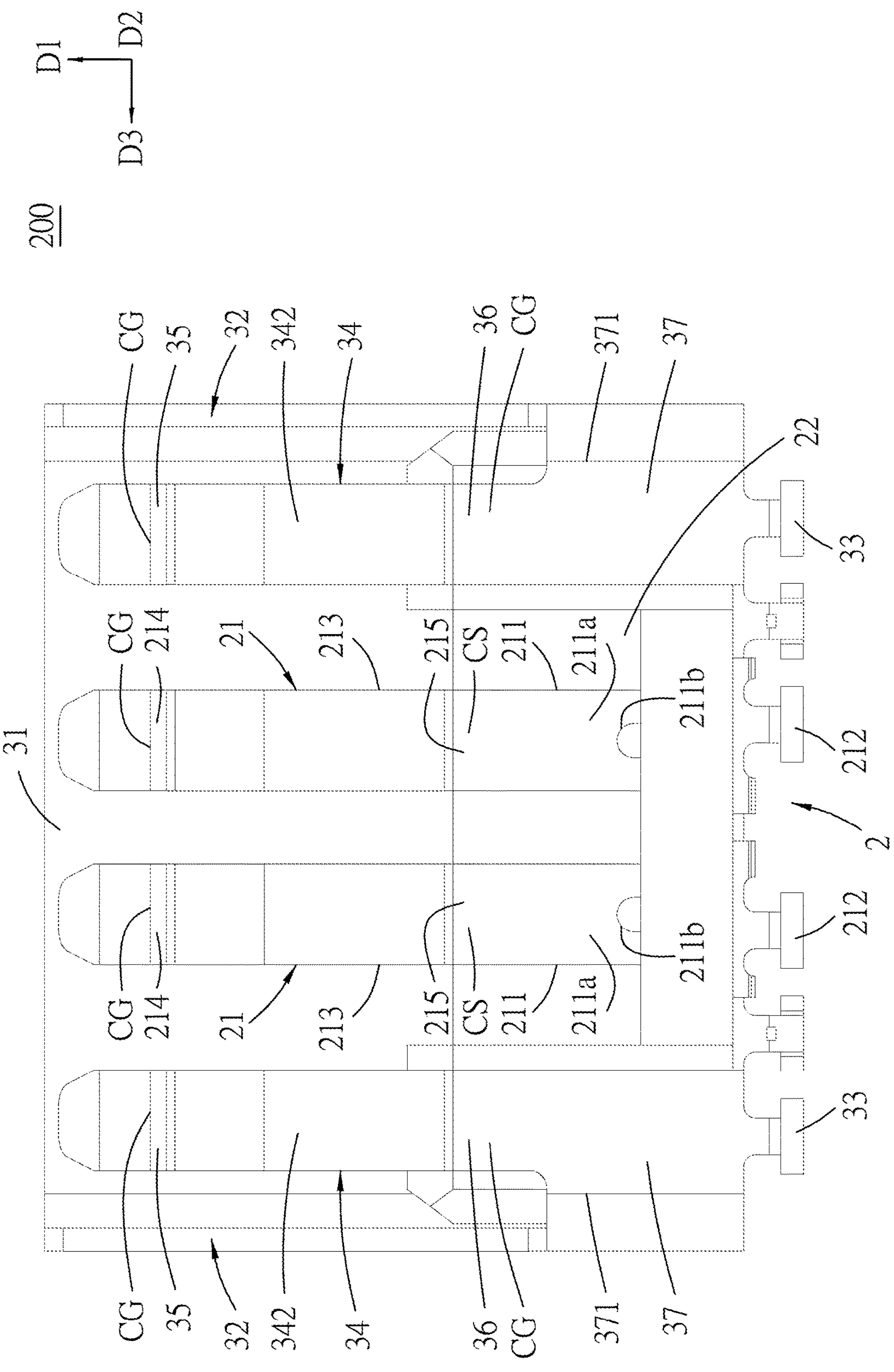
FIG. 12 is a front view of the signal terminal group and the grounding member of the second embodiment.

Referring to FIG. 10 to FIG. 12, a second embodiment of the electrical connector assembly 100 of the present disclosure differs from the first embodiment in that, each grounding member 3 further has two front plate portions 37 which are respectively integrally constructed with the two side walls 32, outer side edges 371, which faces each other, of the two front plate portion 37 each are connected to a lower segment of a front edge of the corresponding side wall 32 and each extend toward the inside relative to the corresponding side wall 32, so that the two front plate portions 37 are respectively positioned at a left side and a right side (outer sides) of the corresponding signal terminal group 2 and are respectively positioned at a front end of a left side and a front end of a right side of the insulative block 22, each front plate portion 37 is constructed with one ground terminal 34 which extends upwardly, each ground terminal 34 has the elastic arm 342 which extends upwardly from the front plate portion 37, the third contact portion 35 is positioned to an upper end of the elastic arm 342, the fourth contact portion 36 is positioned to a lower end of the elastic arm 342, the third contact portion 35 and the fourth contact portion 36 of each ground terminal 34 face the front and are staggered in the up-down direction D1.

Figure 13:
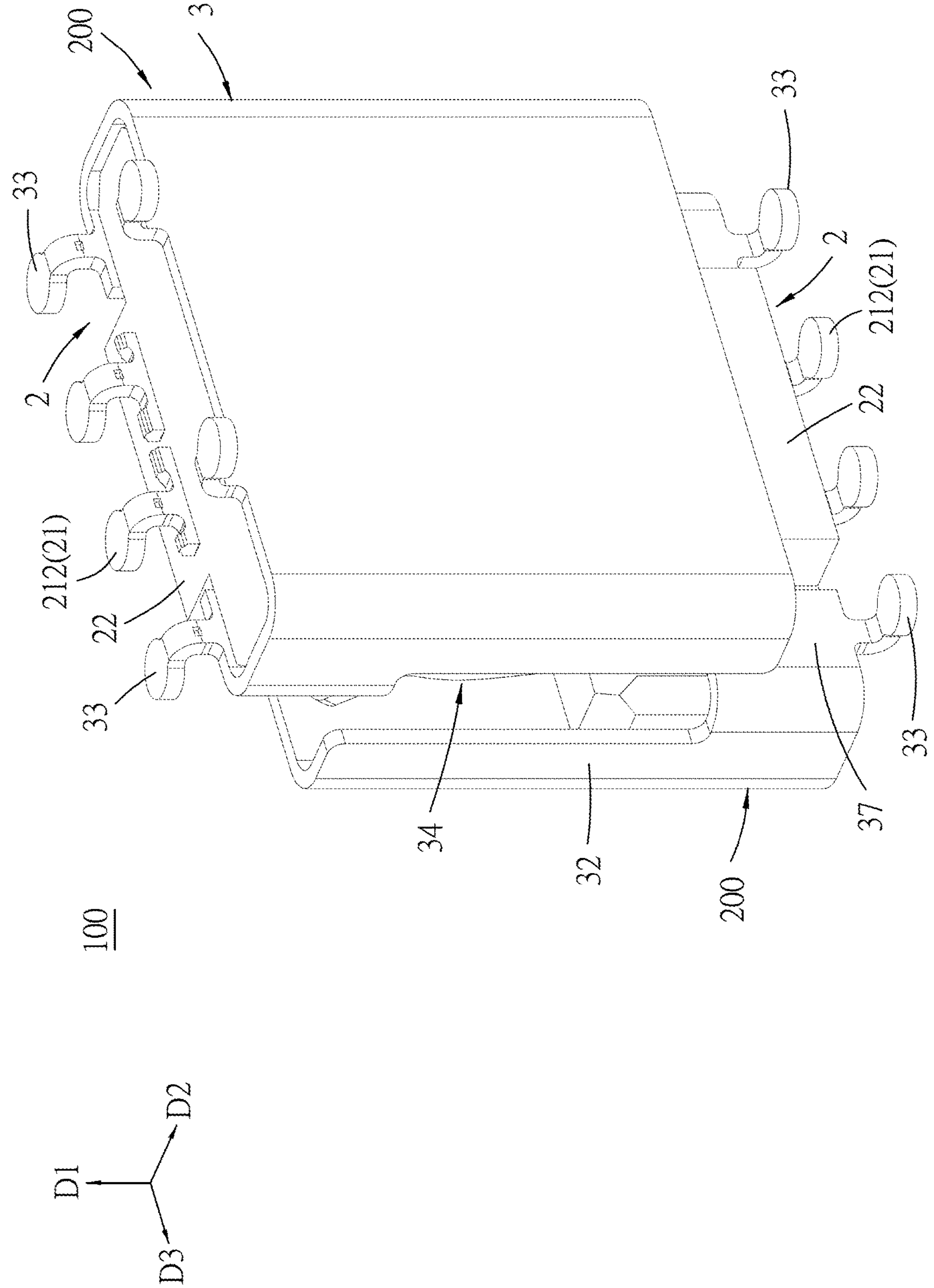
FIG. 13 is a perspective view when the signal terminal groups and the grounding members of the two electrical connectors of the second embodiment mate with each other.
Figure 14:
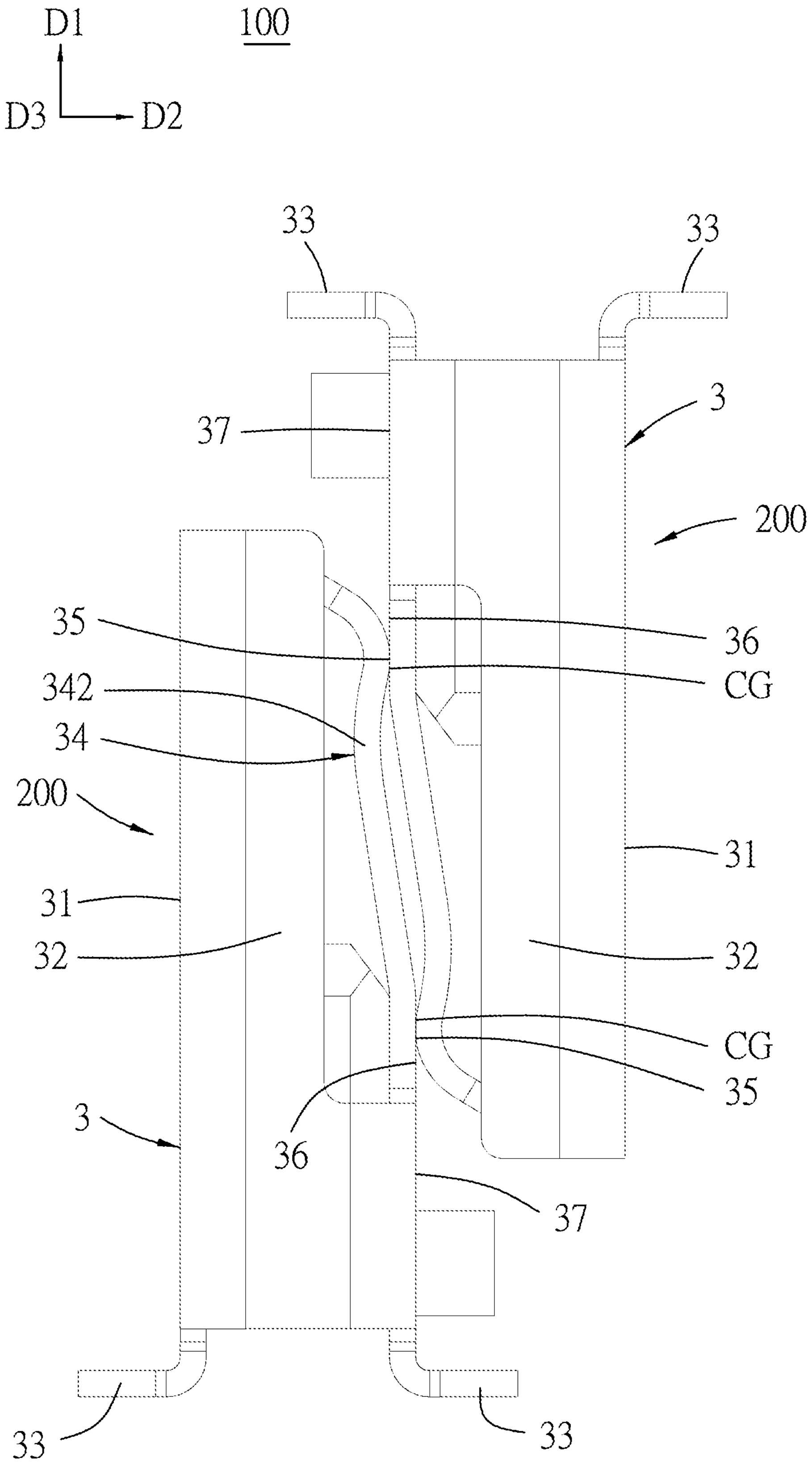
FIG. 14 is a side view when the signal terminal groups and the grounding members of the two electrical connectors of the second embodiment mate with each other.
Figure 15:
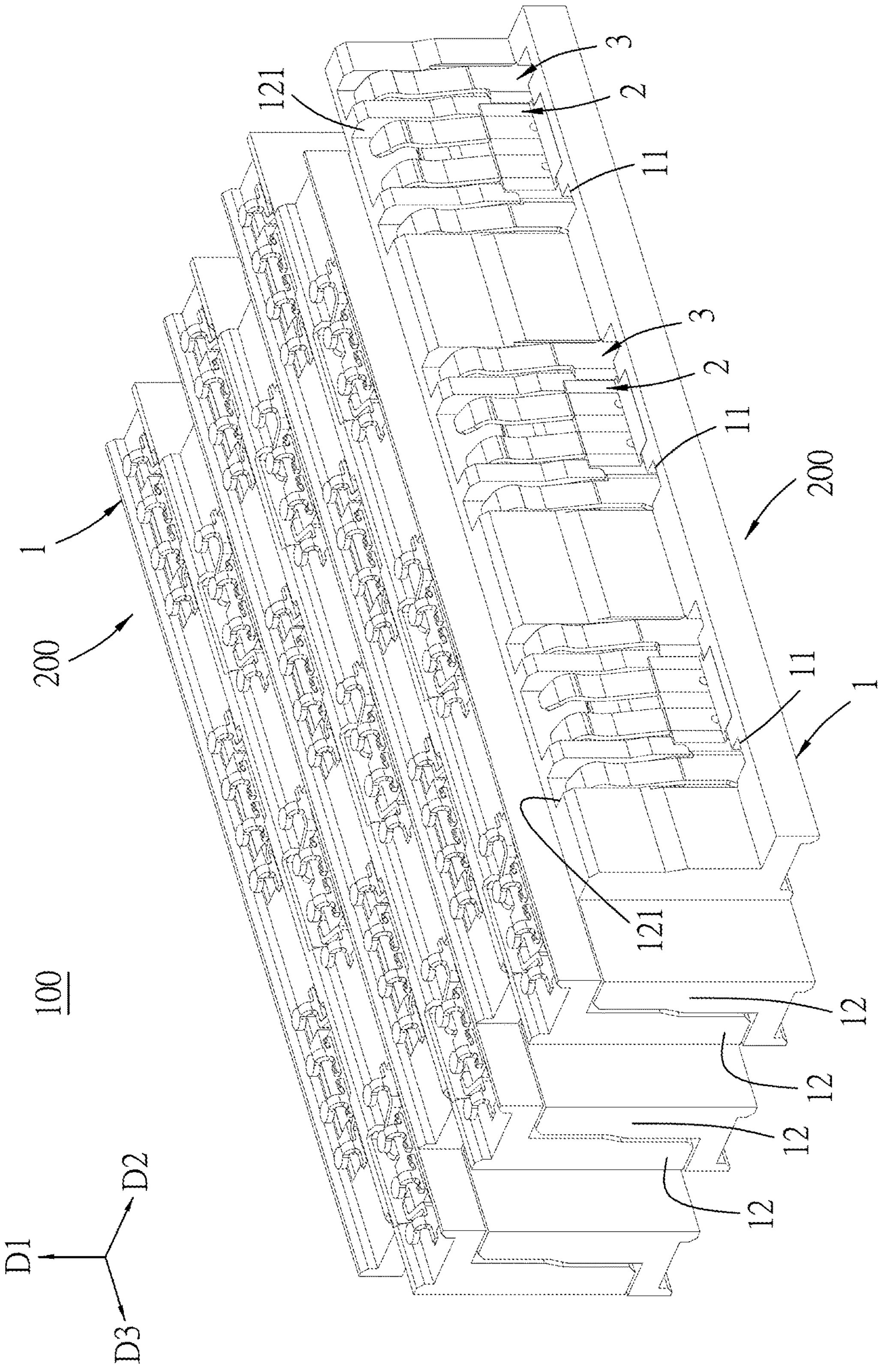
FIG. 15 is a perspective view of a third embodiment of the electrical connector assembly of the present disclosure in which two electrical connectors of the third embodiment mate with each other.
Figure 16:
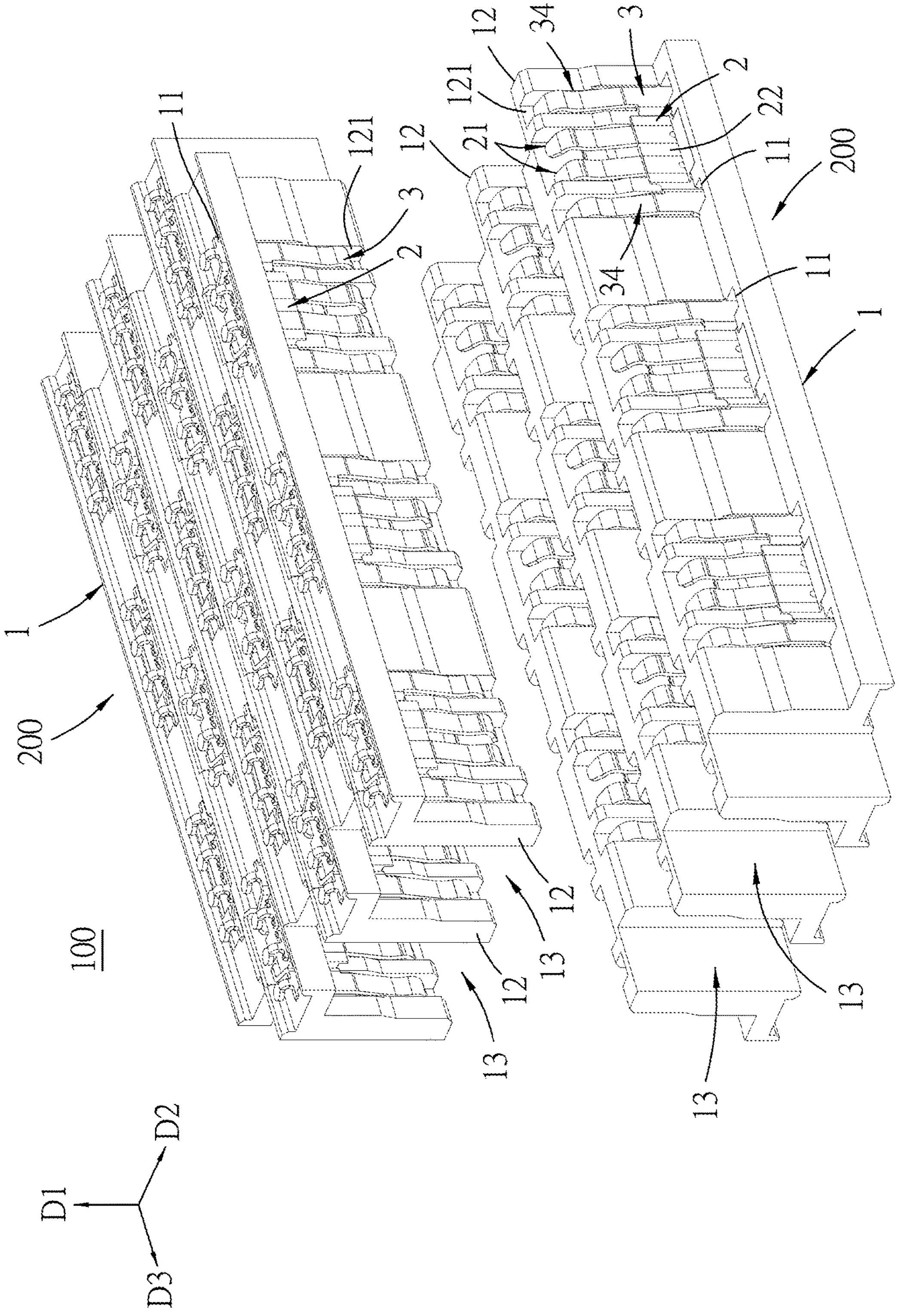
FIG. 16 is a perspective exploded view of FIG. 15.
Figure 17:
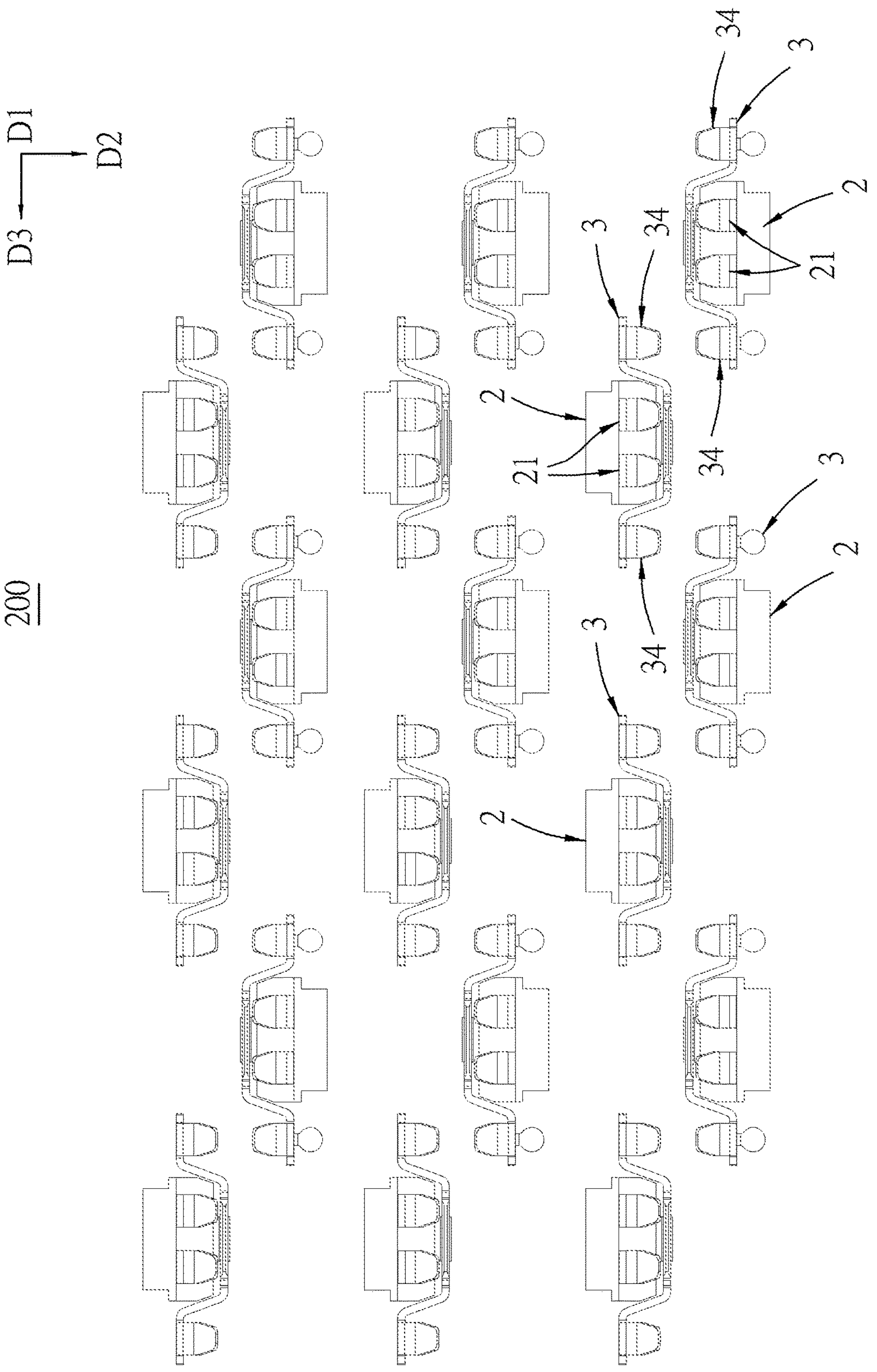
FIG. 17 is a top view of the two electrical connectors of the third embodiment in which bases of the third embodiment are omitted.
Figure 18:
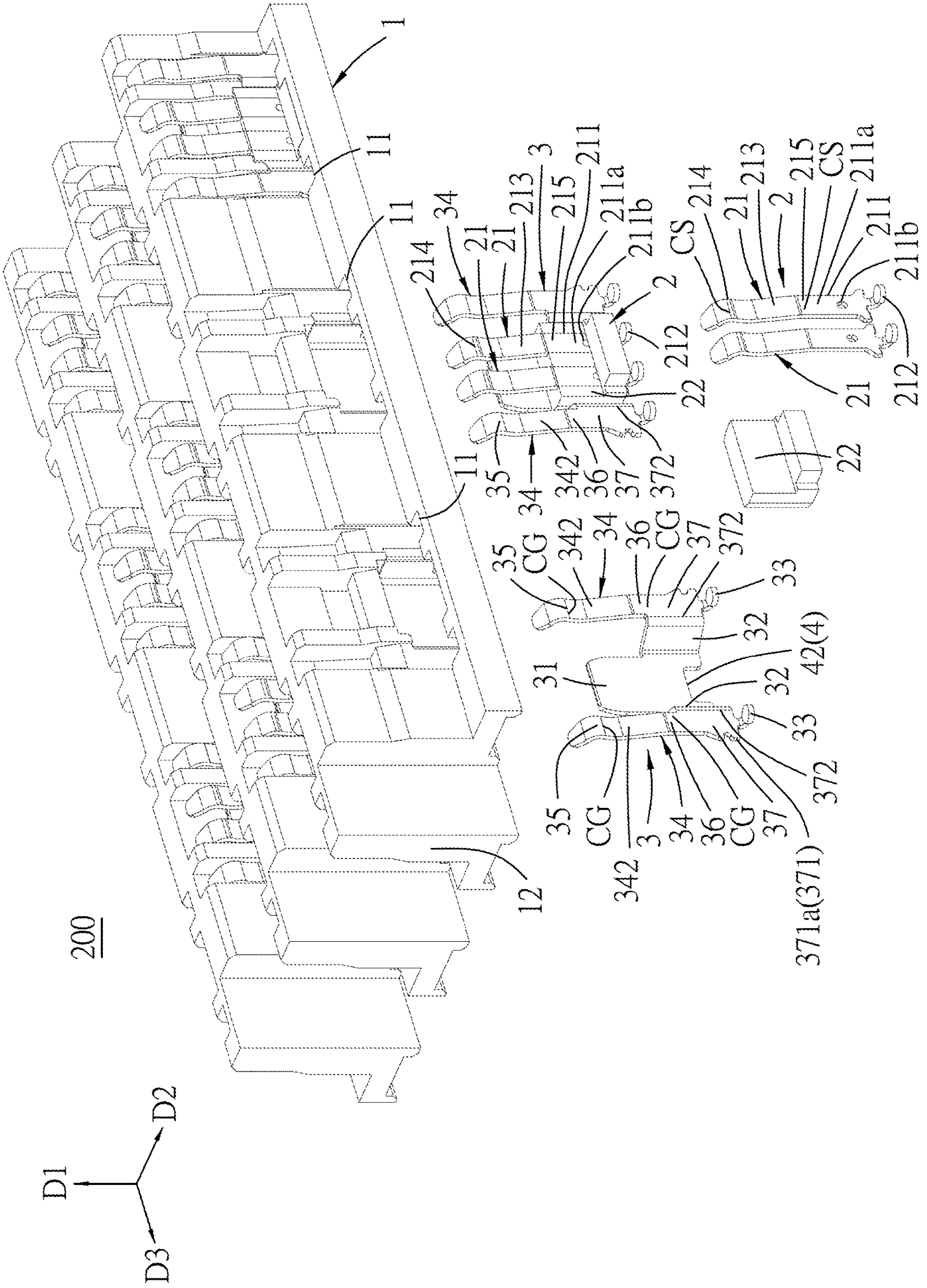
FIG. 18 is a perspective exploded view further on a basis of FIG. 16.
Figure 19:
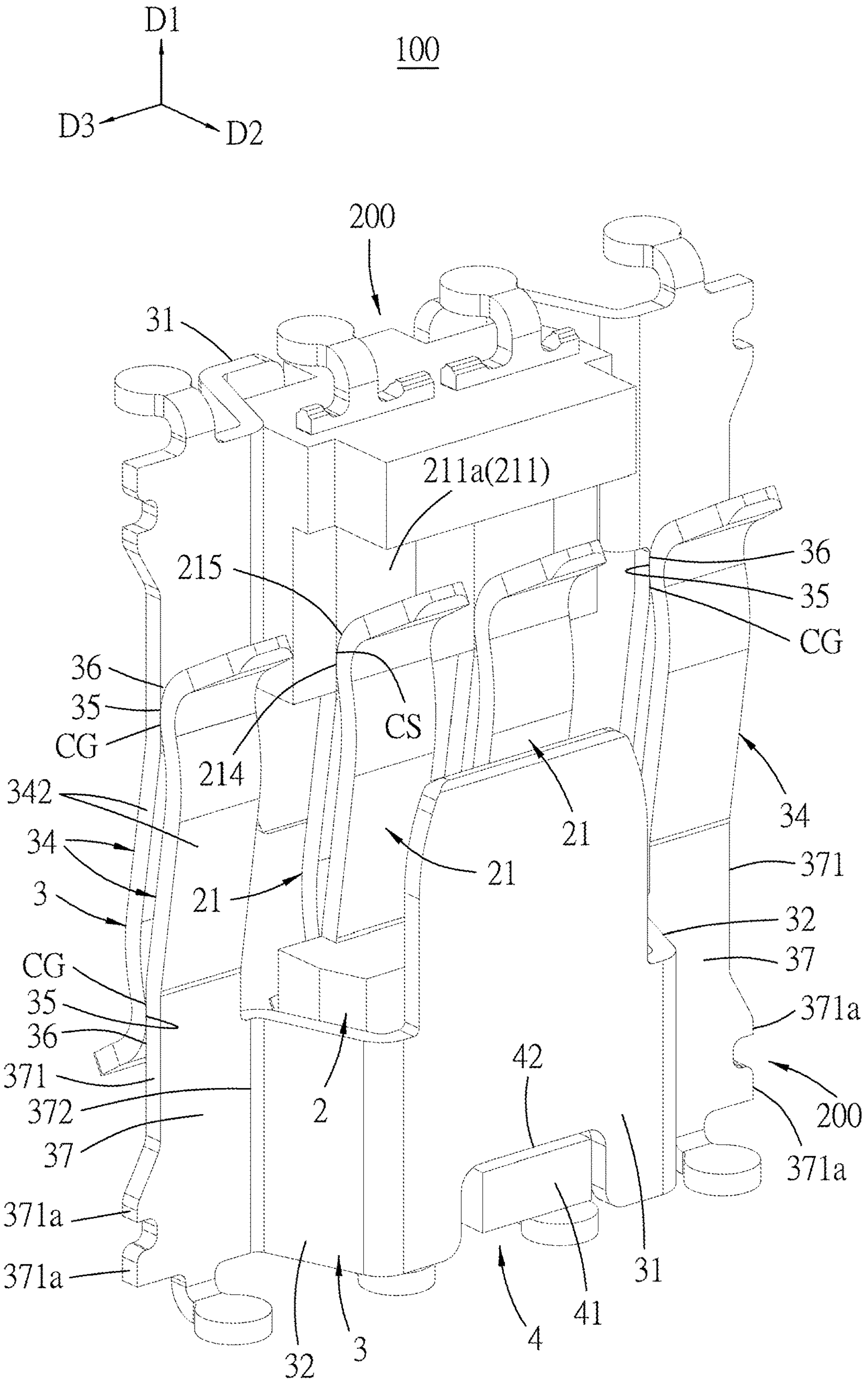
FIG. 19 is a perspective view when signal terminal groups and grounding members of the third embodiment of the two electrical connectors mate with each other.

Referring to FIG. 12 to FIG. 14, when the two electrical connectors 200 mate with each other, the third contact portions 35 of the two grounding members 3 which mate with each other respectively contact the fourth contact portions 36 of the two grounding members 3 which mate with each other, to constitute total four ground contact points CG. The two ground contact points CG, which are positioned to the same side, of the four ground contact points CG are staggered in the up-down direction D1, and, the four ground contact points CG each form contact in the front-rear direction D2. Also, in the second embodiment, two tail portions 33 of the four tail portions 33 of the grounding member 3 are respectively constructed to bottom edges of the two front plate portions 37.

Referring to FIG. 15 to FIG. 19, a third embodiment of the electrical connector assembly 100 of the present disclosure differs from the second embodiment in that, the two side walls 32 obliquely extend forwardly and outwardly from lower segments of two side edges of the rear wall 31 respectively, inner side edges 372, which face each other, of the two front plate portions 37 each are connected to a front edge of the corresponding side wall 32 and each extend toward the outside relative to the corresponding side wall 32, and outer sides edge 371, which face each other, of the two front plate portions 37 each are formed with an interfering protrusion 371*a* which is used to interfere with the assembling hole 11 to strengthen the fixing force. In addition, in the third embodiment, the signal terminal group 2 and the grounding member 3 are respectively assembled to the base 1, the assembling construction 4 includes the protruding block 41 and the insertion hole 42 which are assembled to each other, the protruding block 41 is constructed to a bottom portion of a rear side surface of the insulative block 22, the insertion hole 42 is constructed to a bottom edge of a rear wall 31 of the grounding member 3. Also, in the third embodiment, the base 1 has a plurality of mating protrusions 12 which protrude upwardly and a mating recess 13 which is positioned between adjacent mating protrusions 12, the plurality of mating protrusions 12 are arranged side by side along the front-rear direction D2 and spaced apart from each other, a front side and a rear side of each mating protrusion 12 each arrange and assemble the signal terminal groups 2 and the grounding members 3, and each mating protrusion 12 are formed with receiving grooves 121 which are used to receive the signal terminals and the ground terminals.

In conclusion, in the present disclosure, by the design and arrangement manner that the two grounding members 3 surround the signal terminals 21 from four sides, more complete and full shielding function can be formed with respect to the signal terminals 21, to reduce crosstalk, reduce impedance of the signal terminal 21, strengthen coupling between the signal terminal groups 2, promote integrity of the signal, increase transmission speed of the signal.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connector, comprising:

a plurality of signal terminal groups, each signal terminal group comprising a plurality of signal terminals, each signal terminal having a first contact portion and a second contact portion, the first contact portion having elasticity, the second contact portion having relatively less elasticity compared to the first contact portion, the first contact portion and the second contact portion being staggered with respect to each other; and a plurality of grounding members respectively corresponding to the plurality of signal terminal groups, each grounding member having two side walls and a rear wall which are integrally constructed and surrounding the corresponding signal terminal group from at least three sides, two ground terminals which are integrally constructed and are respectively positioned at a left side and a right side of a corresponding signal terminal group, third contact portions which are respectively constructed to the two ground terminals and have elasticity, and fourth contact portions which are respectively positioned at the left side and the right side of the corresponding signal terminal group and having relatively less elasticity compared to the third contact portions, the respective third contact portion and the respective fourth contact portion at a same side of the corresponding signal terminal group being staggered with respect to each other.

2. The electrical connector of claim 1, wherein each side wall has a corresponding one of the two ground terminals and a side plate portion, a plate face of the side plate portion is constructed with the respective fourth contact portion, the respective third contact portion of the corresponding one of the two ground terminals is disposed toward an inside of the corresponding one of the two ground terminals, while the fourth contact portion of the side plate portion is disposed toward an outside of the corresponding one of the two ground terminals, and the third contact portion and the fourth contact portion of each side wall are staggered in a front-rear direction and in an up-down direction.

3. The electrical connector of claim 1, wherein each grounding member further has two front plate portions which are respectively integrally constructed with the two side walls, the two front plate portions are respectively positioned at the left side and the right side of the corresponding signal terminal group, and outer side edges, which face each other, of the two front plate portions each are connected to the corresponding side wall, each front plate portion is constructed with the ground terminal, each ground terminal has an elastic arras which extends upwardly from the front plate portion, the third contact portion is positioned to an upper end of the elastic arm, the fourth contact portion is positioned to a lower end of the elastic arm, the third contact portion and the fourth contact portion of each ground terminal face a front of the ground terminal and are staggered in an up-down direction.

4. The electrical connector of claim 1, wherein each grounding member further has two front plate portions which respectively are integrally constructed with the two side walls, the two front plate portions are respectively positioned at the left side and the right side of the corresponding signal terminal group, and inner side edges, which face each other, of each front plate portion each are connected to the corresponding side wall, each front plate portion is constructed with the ground terminal, each ground terminal has an elastic arm which extends upwardly from the front plate portion, the third contact portion is positioned to an upper end of the elastic arm, the fourth contact portion positioned to a lower end of the elastic arm, the third contact portion and the fourth contact portion of each ground terminal face a front of the ground terminal and are staggered in an up-down direction.

5. The electrical connector of claim 1, wherein a height of the rear wall and heights of the two side walls in each grounding member each is higher than an upper end of each corresponding signal terminal.

6. The electrical connector of claim 1, wherein each signal terminal has a fixing portion, a tail portion which extends downwardly from the fixing portion, and an elastic arm which extends upwardly from the fixing portion, the first contact portion is positioned to an upper end of the elastic arm, the second contact portion is positioned to a lower end of the elastic arm, the first contact portion and the second contact portion of each signal terminal face a front of the ground terminal and are staggered in an up-down direction.

7. The electrical connector of claim 6, wherein each signal terminal group has two signal terminals which constitute a differential pair and an insulative block, the two signal terminals are provided to the insulative block, a front surface of the fixing portion of each signal terminal is exposed to the insulative block and three other respective surfaces of the fixing portion of each signal terminal are embedded in the insulative block, the second contact portion is constructed to the front surface of the fixing portion.

8. The electrical connector of claim 7, further comprising a base, the base having a plurality of assembling holes, each assembling hole being used to assemble one of the plurality of signal terminal groups and one of the plurality of the grounding members.

9. The electrical connector of claim 8, wherein the signal terminal group and the one of the plurality of grounding members which correspond to each other are firstly assembled with each other by an assembling construction and then are assembled to the base.

10. The electrical connector of claim 9, wherein the assembling construction comprises a protruding block and an insertion hole which are assembled to each other, the protruding block is constructed to a rear side surface of the insulative block, the insertion hole is constructed to the rear wall of the one of the plurality of grounding members.

11. An electrical connector assembly comprising two electrical connectors having a similar construction to mate with each other, each electrical connector comprising:

a plurality of signal terminal groups, each signal terminal group comprising a plurality of signal terminals, each signal terminal having a first contact portion and a second contact portion, the first contact portion having elasticity, the second contact portion relatively not having elasticity compared to the first contact portion, the first contact portion and the second contact portion of each signal terminal being staggered with respect to each other; and a plurality of grounding members respectively corresponding to the plurality of signal terminal groups, each grounding member having two side walls and a rear wall which are integrally constructed and surround the corresponding signal terminal group from at least three sides, two ground terminals which are integrally constructed and are respectively positioned at a left side and a right side of the corresponding signal terminal group, third contact portions which are respectively constructed to the two ground terminals and have relative elasticity, and fourth contact portions which are respectively positioned at the left side and the right side of the corresponding signal terminal group and relatively do not have elasticity when compared to the third contact portion, the third contact portion and the fourth contact portion at the same side of the corresponding signal terminal group being staggered with respect to each other;

wherein:

when the two electrical connectors mate with each other, the two grounding members, which mate with each other, of the two electrical connectors together surround the two signal terminal groups, which mate with each other, from four sides; the third contact portions of the two grounding members which mate with each other respectively contact the fourth contact portions of the two grounding members which mate with each other to constitute total four ground contact points, two ground contact points of the four ground contact points are positioned to the left side and the other two ground contact points of the four ground contact points are positioned to the right side; the first contact portions of the two signal terminals which mate with each other contact the second contact portions of the two signal terminals which mate with each other to constitute two signal contact points, the two signal contact points are staggered in an up-down direction.

12. The electrical connector assembly of claim 11, wherein a height of the rear wall and heights of the two side walls in each grounding member each is higher than an upper end of each corresponding signal terminal.

13. The electrical connector assembly of claim 11, wherein each side wall has a corresponding one of the two ground terminals and a side plate portion, a plate face of the side plate portion is constructed with the respective fourth contact portion, the respective third contact portion of the corresponding one of the two ground terminals is disposed toward an inside of the corresponding one of the two ground terminals, while the fourth contact portion of the side plate portion is disposed toward an outside of the corresponding one of the two ground terminals, and the third contact portion and the fourth contact portion of each side wall are staggered in a front-rear direction and in the up-down direction.

14. The electrical connector assembly of claim 13, wherein the two ground contact points, which are positioned to the same side, of the four ground contact points are staggered in the front-rear direction and in the up-down direction, and the four ground contact points each form contact in a left-right direction.

15. The electrical connector assembly of claim 11, wherein each grounding member further has two front plate portions which are respectively integrally constructed with the two side walls, the two front plate portions are respectively positioned at the left side and the right side of the corresponding signal terminal group, and outer side edges, which face each other, of the two front plate portions each are connected to the corresponding side wall, each front plate portion is constructed with the ground terminal, each ground terminal has an elastic arm which extends upwardly from the front plate portion, the third contact portion is positioned to an upper end of the elastic arm, the fourth contact portion is positioned to a lower end of the elastic arm, the third contact portion and the fourth contact portion of each ground terminal face the front and are staggered in the up-down direction.

16. The electrical connector assembly of claim 15, wherein the two ground contact points, which are positioned to the same side, of the four ground contact points are staggered in the up-down direction, and the four ground contact points each from contact in a front-rear direction.

17. The electrical connector assembly of claim 11, wherein each grounding member further has two front plate portions which respectively are integrally constructed with the two side walls, the two front plate portions are respectively positioned at the left side and the right side of the corresponding signal terminal group, and inner side edges, which face each other, of each front plate portion each are connected to the corresponding side wall, each front plate portion is constructed with the ground terminal, each ground terminal has an elastic arm which extends upwardly from the front plate portion, the third contact portion is positioned to an upper end of the elastic arm, the fourth contact portion positioned to a lower end of the elastic arm, the third contact portion and the fourth contact portion of each ground terminal face the front and are staggered in the up-down direction.

18. The electrical connector assembly of claim 17, wherein the two ground contact points, which are positioned to the same side, of the four ground contact points are staggered in the up-down direction, and the four ground contact points each from contact in a front-rear direction.

19. The electrical connector assembly of claim 11, wherein each signal terminal has a fixing portion, a tail portion which extends downwardly from the fixing portion, and an elastic arm which extends upwardly from the fixing portion, the first contact portion is positioned to an upper end of the elastic arm, the second contact portion is positioned to a lower end of the elastic arm, the first contact portion and the second contact portion of each signal terminal face a front of the ground terminal and are staggered in an up-down direction, the two signal contact points each form contact in a front-rear direction.

20. The electrical connector assembly of claim 19, wherein each signal terminal group has two signal terminals which constitute a differential pair and an insulative block, the two signal terminals are provided to the insulative block, a front surface of the fixing portion of each signal terminal is exposed to the insulative block and three other respective surfaces of the fixing portion of each signal terminal are embedded in the insulative block, the second contact portion is constructed to the front surface of the fixing portion.

* * * * *